United States Patent [19]

Takao et al.

[11] Patent Number: 4,509,477
[45] Date of Patent: Apr. 9, 1985

[54] IDLE OPERATION CONTROL FOR INTERNAL COMBUSTION ENGINES

[75] Inventors: Mitsunori Takao, Kariya; Takahiko Kimura, Nagoya, both of Japan

[73] Assignee: Nippondenso Co., Ltd., Kariya, Japan

[21] Appl. No.: 553,295

[22] Filed: Nov. 18, 1983

[51] Int. Cl.³ .................................. F02P 5/04; F02B 3/00
[52] U.S. Cl. ..................................... 123/339; 123/436; 123/419; 123/417
[58] Field of Search ............... 123/352, 339, 436, 419, 123/417

[56] References Cited

U.S. PATENT DOCUMENTS

| | | | |
|---|---|---|---|
| 4,357,662 | 11/1982 | Schira | 123/436 |
| 4,365,601 | 12/1982 | Yamazoe | 123/339 |
| 4,375,668 | 3/1983 | Leung | 123/419 |
| 4,418,669 | 12/1983 | Johnson | 123/436 |

FOREIGN PATENT DOCUMENTS

2042772  9/1980  United Kingdom ............... 123/436

*Primary Examiner*—Ronald B. Cox
*Attorney, Agent, or Firm*—Cushman, Darby & Cushman

[57] ABSTRACT

Idling speed of the internal combustion engine is controlled to a predetermined engine speed by correcting an engine operating parameter, such as, an ignition timing, the quantity of fuel injection, etc., to suppress a variation rate of the engine torque. Instead of detecting the torque variation rate directly, an engine speed variation rate is detected, and a correction value of the engine parameter is determined as a function of the engine speed variation rate based on the finding that the torque variation rate can be approximated as the engine speed variation rate with a fixed phase difference therebetween. Since the phase difference is determined by the engine speed, a correction value at the present moment is obtained from the previously obtained correction value which is preceding by the phase difference.

8 Claims, 10 Drawing Figures

IDLE OPERATION CONTROL FOR INTERNAL COMBUSTION ENGINES

BACKGROUND OF THE INVENTION

1. Field of the Invention

The present invention relates to a method and apparatus for controlling the idle operation of an internal combustion engine. The method for controlling the idle operation of an internal combustion engine according to the invention is used for the control of an internal combustion engine equipped with an electronically controlled fuel injection system, particularly for controlling the rotational speed of such an engine during the periods of idling operation such as, idle running or very low speed running by controlling for example the quantity of fuel injected, the ignition timing or the quantity of air flow to the engine.

2. Description of the Prior Art

Generally, in an engine equipped with an electronic fuel injection system of the speed-density type, the quantity of fuel injected is determined in a manner that a stoichiometric air-fuel ratio is substantially attained by a basic fuel injection quantity determined by making an engine speed correction to a fuel injection quantity determined in accordance with a two-dimensional map of the engine rotational speed and intake pressure. And the thus determined basic fuel injection quantity is corrected for the engine cooling water temperature, the intake air temperature, the battery voltage, etc., thereby using it for controlling the engine. This basic fuel injection quantity is substantially determined principally on the basis of the intake pressure and the effect of the engine rotational speed is small compared with the effect of the intake pressure.

In the engine equipped with an electronic fuel injection system of the speed-density type, the occurrence of any disturbance in the engine at no load operation causes both the engine speed and intake pressure to vary and the quantity of fuel injected varies substantially in the same phase with the intake pressure. On the other hand, during the transitional period of the engine the torque developed in the engine varies due to a variation in the air-fuel ratio of the mixture within each cylinder caused by the difference in travel speed between the air and the fuel and a variation in the quantity of air-fuel mixture caused by variation of the intake pressure and this torque variation differs in phase from the intake pressure variation due to a time delay between the combustion of the injected fuel and the development of the torque.

Then, the engine equipped with a speed-density-type electronic fuel injection system includes a large capacity surge tank in the intake system and therefore a phase difference occurs between a variation in the engine rotational speed and a variation in the intake pressure. Thus, a phase difference occurs between a variation in the engine rotational speed and a variation in the torque developed in the engine. Due to this phase difference, when the engine rotational speed decreases, the torque is decreased causing a further decrease in the engine rotational speed, and conversely, when the engine rotational speed increases it results in a torque developing characteristic of the engine thus promoting the variation of the engine rotational speed, thereby causing a phenomenon in which the engine rotational speed become unstable.

To overcome this deficiency, as disclosed, for example, in a Japanese Lay-Open Patent Publication No. 57-38642 (1982), there has been known a method in which a variation of the rotational speed and a variation of the intake pressure of an engine at each interval of successive ignitions or fuel injections are detected so that on the basis of the variation rates a correction factor is determined for each of the ignition timing and the fuel injection quantity so as to suppress the variation of the torque developed in the engine.

However, this known method does not take into account the difference in phase between the variation in the engine rotational speed and the variation in the developed engine torque, and therefore the variation in the engine rotational speed during the idling operation is not suppressed satisfactorily.

SUMMARY OF THE INVENTION

In view of the foregoing deficiencies in the prior art, it is an object of the present invention to provide an engine idle operation controlling method and apparatus capable of stably controlling the rotational speed of an engine to a predetermined value during idle operation.

It is another object of the invention to provide an engine idle operation control method and apparatus so designed that the development of torque in the engine is detected by means of engine rotational speed data and in accordance with the detected torque condition at least one engine operation parameter, such as, the ignition timing, the quantity of fuel injected, etc., is corrected thereby effectively suppressing the variation in the engine torque developed.

To accomplish the above and other objects, in accordance with the present invention the operation of correcting at least one engine operation parameter and thereby controlling the rotational speed of the engine to a predetermined value during the idle operation is performed by successively detecting the engine speed so as to detect an engine rotational speed variation characteristic, detecting an engine torque variation characteristic in accordance with the engine rotational speed variation characteristic, detecting a phase difference between the two characteristics on the basis of the engine rotational speed, determining an engine torque variation condition at the present moment on the basis of the torque variation characteristic data and the phase difference data and then correcting said at least one engine operation parameter in a direction to minimize the engine torque variation.

Thus, in the present invention, during the periods of idle operation including very low speed running of an engine the engine rotational speed is stably controlled to a predetermined value, more particularly the engine rotational speed is stably controlled to a predetermined value by detecting a variation in the engine torque development on the basis of the engine rotational speed data and correcting at least one engine operation parameter, such as, the ignition timing, the quantity of fuel injected, etc., in a direction to minimize the torque variation thereby effectively suppressing the engine torque variation.

DESCRIPTION OF THE PREFERRED EMBODIMENTS

A preferred embodiment of the present invention will be described with reference to the drawings.

Figure 1:
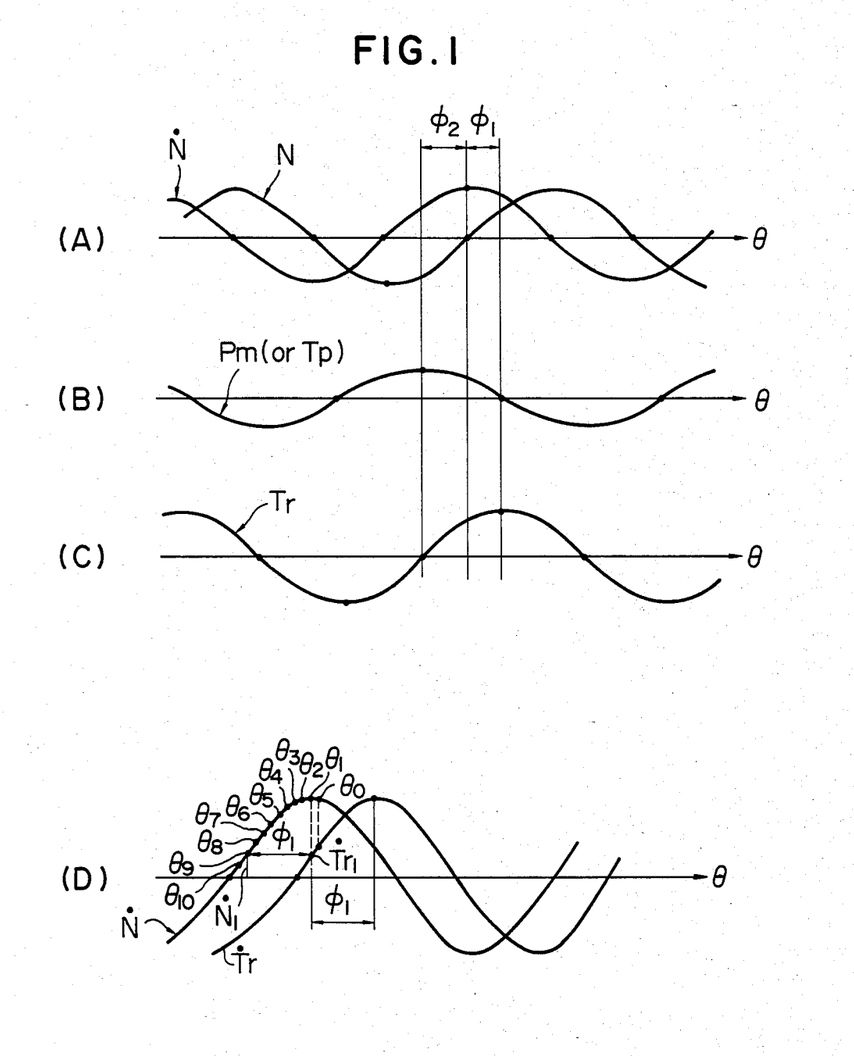
FIG. 1 shows engine operating condition characteristic diagrams for explaining a basic control method according to the invention.

The basic control principle of the invention will be described first. In FIG. 1, characteristic diagrams (A), (B) and (C) respectively shown the engine rotational speed N and engine rotational speed variation rate N (i.e., $\Delta N/\Delta \theta$ or $\Delta N/\Delta t$, where $\theta$ is a crank angle), intake pressure Pm or injection pulse time width $T_p$ and developed engine torque $T_r$ in an engine equipped with a speed density-type electronic fuel injection system including a relatively large capacity surge tank in the intake system. The torque $T_r$ varies at a period of about 0.5 to 2 seconds during the idle operation. What is to be noted here is the finding that the engine torque variation characteristic can be approximated as the engine speed variation characteristic and there is a given phase difference $\phi_1$ between the two which is dependent on the engine speed N. Therefore, by detecting the variation rate N of the engine speed N and the phase difference $\phi_1$, it is possible to estimate (detect) the present engine torque variation and the just following engine torque variation. Then, by correcting at least one engine operation parameter, such as, the ignition timing, the quantity of fuel injected, etc., in accordance with the torque variation rate, it is possible to control the engine speed so as to minimize the engine torque variation.

More specifically, as shown in (D) of FIG. 1, ignition timing correction values or the like are preliminarily stored which are required to minimize the torque variation in relation to the engine speed variation rate N (i.e., the value that can be approximated as the engine torque variation rate $T_r$) determined at a predetermined angular position interval of the engine (e.g., at intervals of 180° crank angle) or the past history over an angular rotational range sufficiently larger than the phase difference $\phi_1$. Then, if it is desired at an angular position $\theta_1$, for example, to obtain the desired ignition timing correction value for minimizing the torque variation at the present moment, it can be estimated by determining the corresponding phase difference $\phi_1$ from the engine speed N at the present moment and considering the engine speed variation rate N (i.e., the approximated torque variation rate $T_r$) preceding by the phase angle $\phi_1$ as substantially equal to a torque variation rate $T_{r1}$ at the present moment. In this case, from the graph in (D) of FIG. 1 it is seen that an engine speed variation rate $N_1$ at about an angular position $\theta_9$ is substantially equal to the torque variation rate $T_{r1}$ at the present moment. Thus, if the ignition timing correction value obtained at the said angular position $\theta_9$ is fetched and used, it is possible to obtain an operating parameter that suits the torque variation rate at the present moment. In this case, since the intervals between the angular positions $\theta_1, \theta_2, \theta_3, \ldots, \theta_{10}$ are fixed (e.g., 180°), the corresponding angular position can be determined by dividing the phase difference $\phi_1$ by this fixed angle. Also, it can be detected in minute detail by using an interpolation calculation. Note that the phase difference $\phi_1$ between an engine torque variation rate and an engine speed variation rate is determined by the engine speed N, the capacity of the intake system, etc., and therefore its values must be determined preliminarily by experiments.

Also, the operation parameter, e.g., the ignition timing correction value obtained at the moment of the angular position $\theta_1$ is a value that will be used at the next angular position $\theta_0$ and therefore there is some deviation in torque variation rate at the position $\theta_0$ as shown in the graph. Thus, it is preferable to consider the deviation and use a stored value in a map for setting operation parameter values, e.g., ignition timing correction values or include a deviation compensating term in an operation parameter calculating formula.

Figure 2:
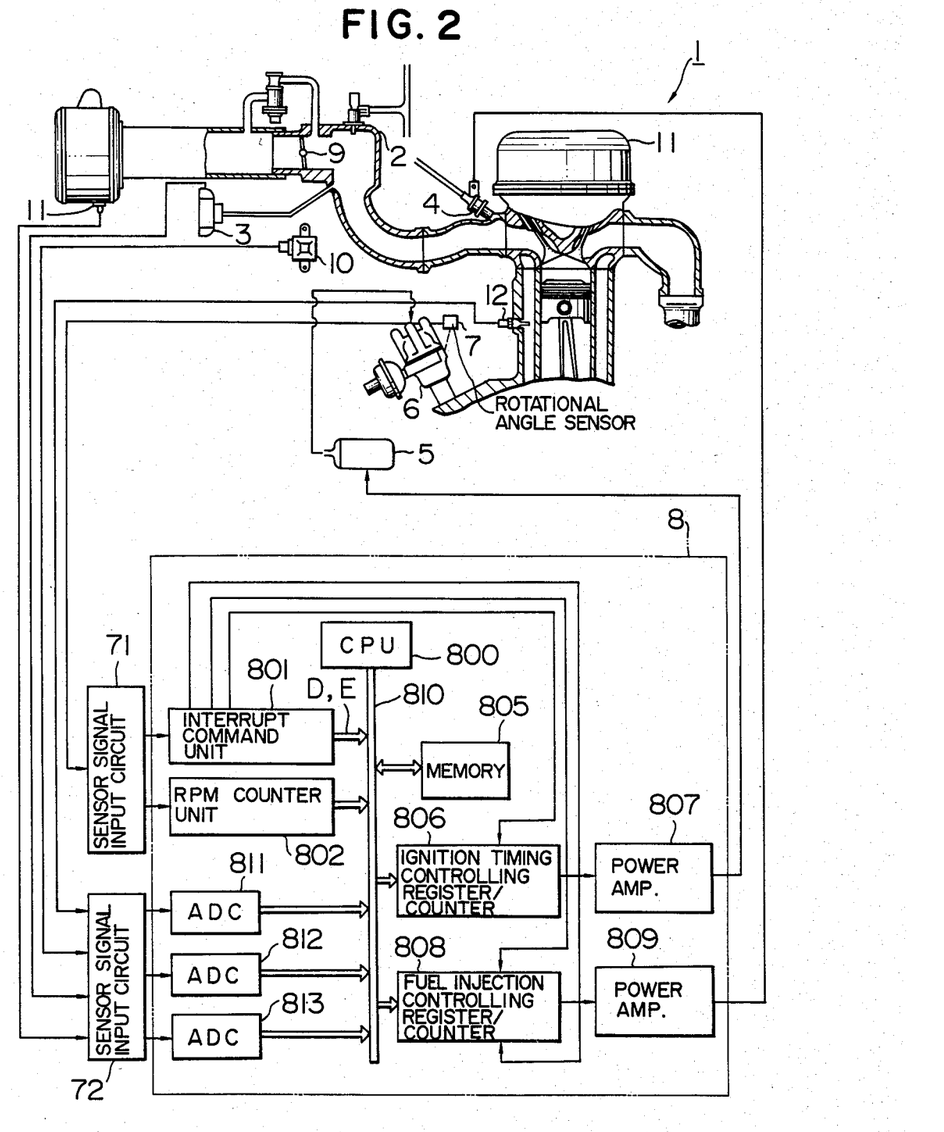
FIG. 2 is a schematic block diagram showing the overall construction of an apparatus according to the invention.

FIG. 2 shows the presently preferred apparatus embodiment of the invention. In the apparatus of FIG. 2, the internal combustion engine is a four cylinder engine 1. A semiconductor pressure sensor 3 is provided to detect the pressure in an intake manifold 2. An electromagnetically operated fuel injection valve unit 4 is arranged in the vicinity of each cylinder intake port of the intake manifold 2 to inject fuel having a regulated constant pressure into the engine 1. An ignition coil 5 and a distributor 6 are provided as an ignition system. The distributor 6 which makes one revolution for every two revolutions of the engine crankshaft includes therein a rotational angle sensor 7 for detecting engine rotational angles. In addition to the pressure sensor 3 for detecting the pressure in the intake manifold 2, there are provided a throttle sensor 10 for detecting the fully closed or substantially fully closed position of a throttle valve 9, an intake air temperature sensor 11 for detecting the temperature of an intake air and a cooling water temperature sensor 12 for detecting that the engine 1 has warmed up.

A computing circuit 8 is provided to perform the desired engine control in response to the detection signals from the above-mentioned sensors. The computing circuit 8 receives the sensor signals through sensor signal input circuits 71 and 72. The computing circuit 8 includes a central processing unit or CPU 800, a common bus 810, an interrupt command unit 801, an RPM counter unit 802, A/D converters 811, 812 and 813, a memory unit 805, an ignition timing controlling register/counter unit 806, a fuel injection time controlling register/counter unit 808 and power amplifiers 807 and 809.

The signals from the rotational angle sensor 7 include three kinds of signals which are supplied through the sensor signal input circuit 71 to the interrupt command unit 801 and the RPM counter unit 802, respectively. The signals from the cooling water temperature sensor 12, the throttle sensor 10, the pressure sensor 3 and the intake air temperature sensor 11 are applied to the A/D converters 811, 812 and 813. In response to the rotational angle signals from the rotational angle sensor 7 the interrupt command circuit 801 applies commands via the common bus 810 to the CPU 800 to perform interrupt actions for the calculation of a fuel injection quantity and the calculation of an ignition timing and it also supplies operation starting time controlling timing signals to the ignition timing controlling register/counter unit 806 and the fuel injection time controlling register/counter unit 808. The RPM counter unit 802 receives the rotational angle signals from the rotational angle sensor 7 so as to count the period of a given rotational angle in response to the clock signals of a given frequency from the CPU 800 and thereby calculate the engine speed. The signals from the cooling water temperature sensor 12, the throttle valve sensor 10, the pressure sensor 3 and the intake air temperature sensor 11 are subjected to A/D conversion by the A/D converters 811, 812 and 813 and are then read into the CPU 800 through the common bus 810. The memory unit 805 stores the control programs of the CPU 800 and it also stores the data from the units 801, 802, 811, 812 and 813.

In the ignition timing controlling register/counter unit 806, the digital signals indicative of an ignition coil energization time and an energization interrupting moment and computed by the CPU 800 are calculated respectively as a time and a moment in terms of engine rotational angles. The output of the unit 806 is amplified by the power amplifier 807 whose output is supplied to the ignition coil 5 to control the times at which the ignition coil 5 is energized and interrupted. In the fuel injection time controlling register/counter unit 808, the digital signal indicative of the duration of opening of the fuel injection valves 4 and computed by the CPU 800 is converted by two down-counters of the same function to a pulse signal having a pulse time width that determines the duration of opening of the fuel injection valves 4. The output of the unit 808 is amplified by the power amplifier 809 whose output is supplied to the fuel injection valves 4.

The angle signals from the rotational angle sensor 7 are applied to the interrupt command unit 801 which in turn generates interrupt command signals for the calculation of an ignition timing and the calculation of a fuel injection quantity. More specifically, the angle signals include a signal indicative of a reference angular position and a signal indicative of a unit crank angle in 30° steps, for example, and signals indicative of given crank angles are generated by dividing the frequency of the unit crank angle signals in response to the reference position signal. In the case of the four cylinder engine, for example, a signal is generated once for each 180° crank angle and the signal (an interrupt command signal) commands the CPU 800 to perform an ignition timing computing interrupt processing. Also, a signal is generated for each 360° crank angle so as to command for a fuel injection quantity computing interrupt processing. Of course, this signal assumes a case in which the fuel injection quantity for each combustion is supplied in two parts and the fuel is injected simultaneously into the respective cylinders (or the cylinder groups), and the invention is also applicable with appropriate modification to other fuel supply systems.

Figure 3A:
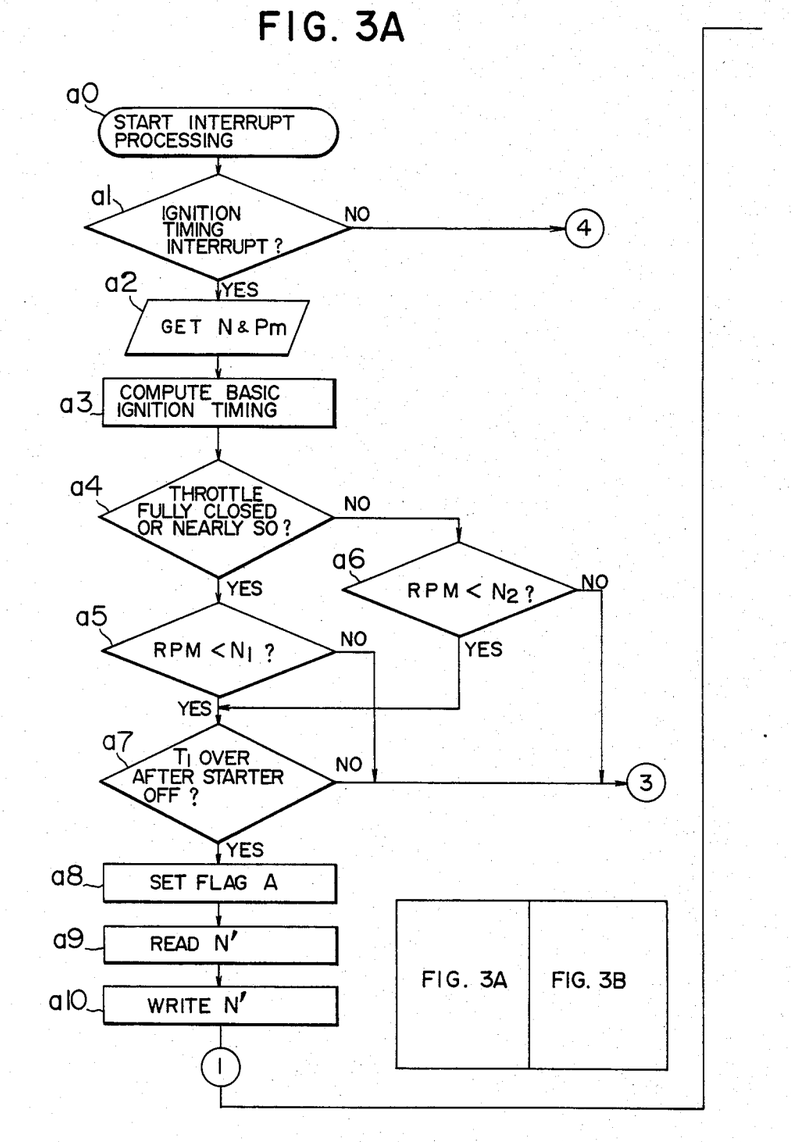
FIGS. 3A, 3B and 3C are flow charts for explaining the operation of the invention.
Figure 3B:
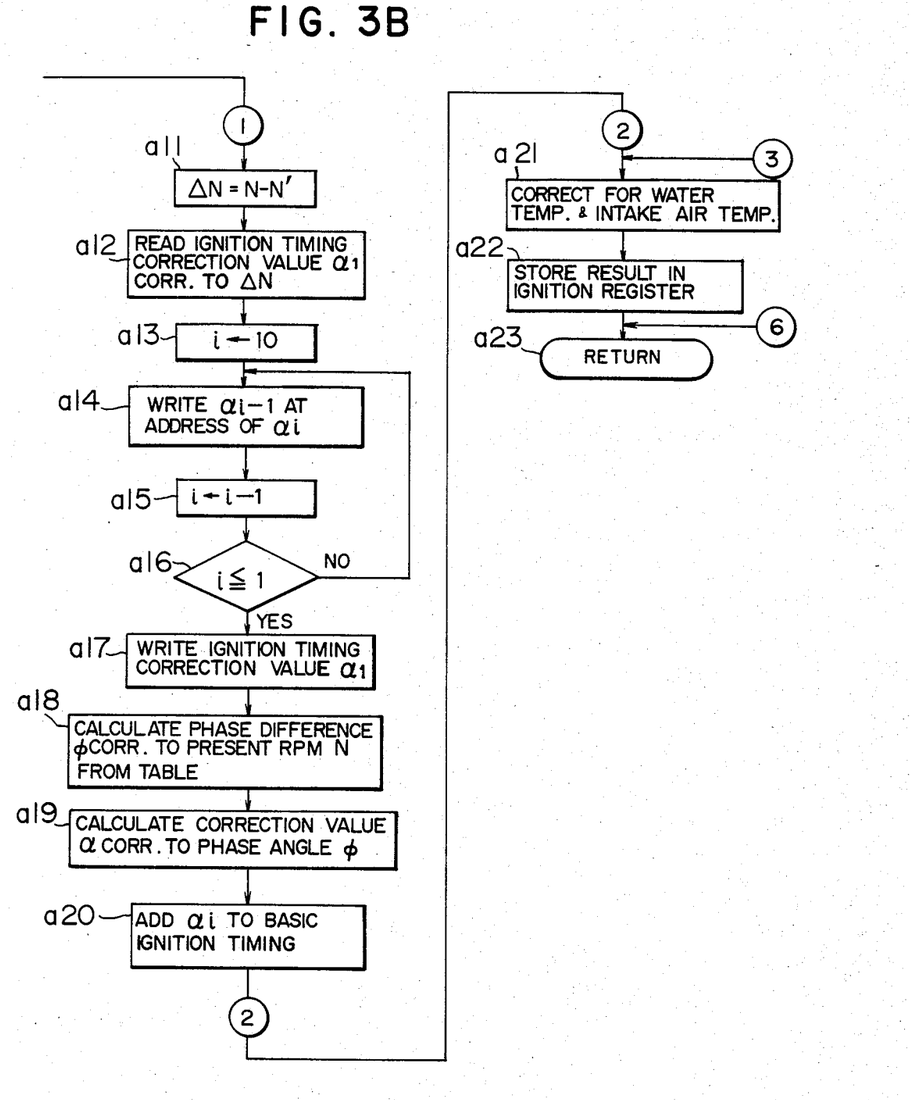
Figure 3C:
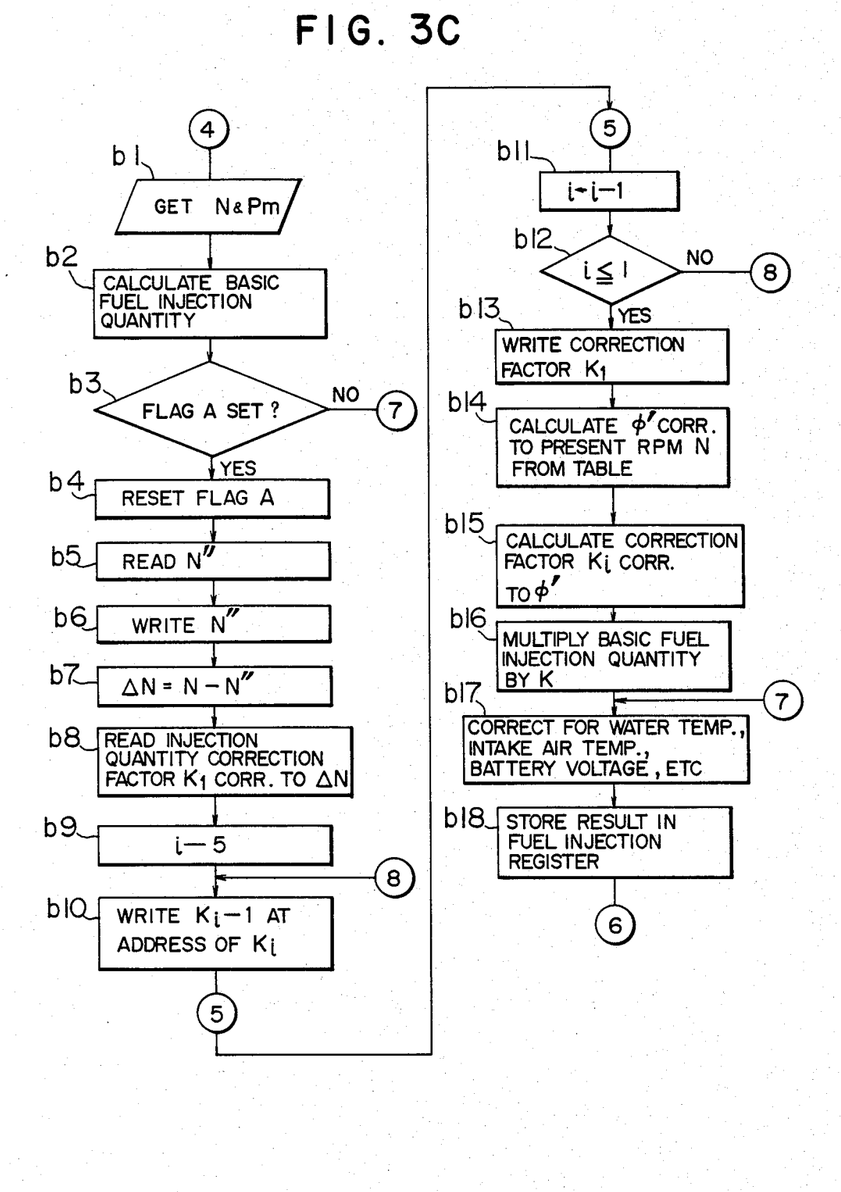

Next, the operation of the apparatus of FIG. 2 will be described with reference to the logical flow charts of FIGS. 3A, 3B and 3C. When the engine is started so that an ignition timing or fuel injection quantity computing interrupt command signal D or E is received from the interrupt command unit 801, regardless of whether a main routine is being executed, the CPU 800 immediately interrupts the execution of the main routine and transfers to a step $a_0$ of the interrupt routine shown in FIG. 3A. If the ignition timing computing interrupt command signal D is received, a transfer is made from a step $a_1$ to a step $a_2$ so that an engine speed indicative signal N produced by the RPM counter 802 and an intake pressure $P_m$ produced by the A/D converter unit 811–813 are fetched from a RAM section of the memory unit 805. At a step $a_3$, a basic ignition timing stored in a two-dimensional map of N and $P_m$ values is read from the memory unit 805.

At steps $a_4$, $a_5$, $a_6$ and $a_7$, it is determined whether the appropriate conditions exist to correct the engine operation parameter (the ignition timing or the fuel injection quantity).

If appropriate conditions do not exist, a transfer is made to the operation of a step $a_{21}$. If appropriate conditions exist, a transfer is made to a step $a_8$ where a correction flag A for indicating the possibility of correction of the engine operation parameter is set to indicate that the correction is enabled. At a step $a_9$, an engine speed indicative signal N' stored by the previous ignition timing interrupt processing is read from the RAM section of the memory unit 805 and supplied to the CPU 800. At a step $a_{10}$, the signal N fetched at the step $a_2$ is written into the RAM section of the memory unit 805. This written signal N is used as a signal N' in the next ignition timing interrupt processing.

At a step $a_{11}$, an engine speed variation $\Delta N = N - N'$ is calculated, and at a step $a_{12}$ an ignition timing correction value $\alpha_1$ corresponding to the engine speed variation N (i.e., N) which approximates the engine torque variation, is read from a correction value map (FIG. 6) in the ROM section of the memory unit 805.

Figure 4:
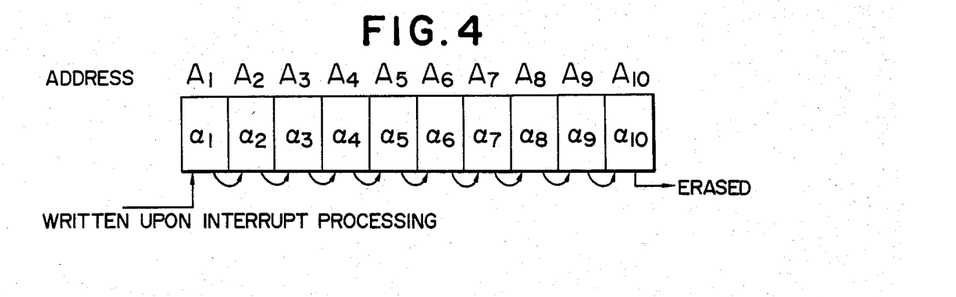
FIG. 4 is a data diagram showing the manner in which ignition timing correction values $\alpha$ are stored.

At steps $a_{13}$, $a_{14}$, $a_{15}$ and $a_{16}$, the ignition timing correction values $\alpha_1$ to $\alpha_{10}$ which were obtained by the past ten ignition timing interrupt processings are stored as shown in FIG. 4. This is determined by the previously mentioned finding that the engine torque variation characteristic can be approximated by the engine speed variation characteristic and that the past history data of the engine speed variation rates over an angular rotational range greater than the phase difference $\phi$ is necessary.

The addresses of the ignition timing correction values $\alpha_1$ to $\alpha_{10}$ for the past ten processings are sequentially shifted and the oldest correction value $\alpha_{10}$ is erased. Then, at a step $a_{17}$, the correction value $\alpha_1$ obtained at the step $a_{12}$ is written at an address $A_1$.

Figure 5:
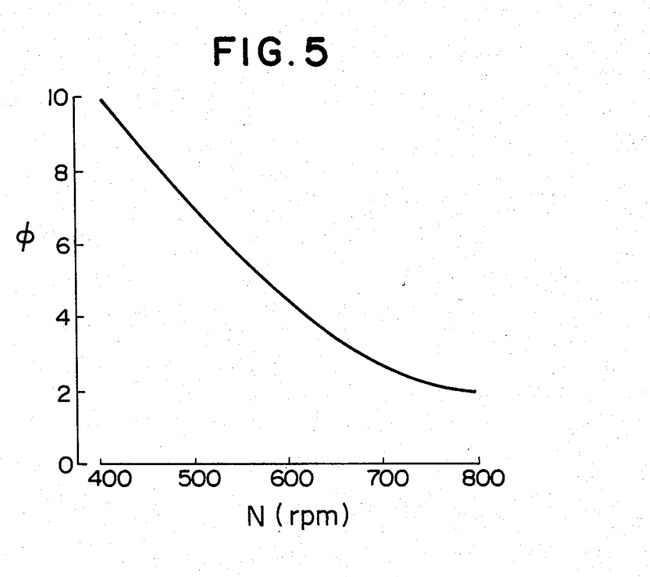
FIG. 5 is a characteristic diagram showing the relationship between the engine rotational speed N and the phase difference $\phi$.

Then, at a step $a_{19}$, a value indicative of the phase difference $\phi$ between the engine speed variation rate N and the torque variation rate $T_r$ corresponding to the engine speed N fetched at the step $a_2$ is taken from the setting map shown in FIG. 5. At a step $a_{19}$, a correction value $\alpha$ of the basic ignition timing is obtained from the following equation.

$$i < \phi < i+1 \text{ (where } i \text{ is an integer)}$$

$$\alpha = (i+1-\phi) \times \alpha i + (\phi - i) \times \alpha i + 1$$

In other words, the phase difference $\phi$ between engine torque variation rate $T_r$ and the engine speed variation rate N is substantially proportional to the engine speed N and therefore the phase difference $\phi$ at the present moment can be easily obtained from the engine speed N. As a result, the torque variation rate at the present moment can be estimated as being substantially equal to the engine speed variation rate preceding by the phase difference $\phi$. Thus, if the ignition timing correction value $\alpha$ obtained at a time preceding by the phase difference $\phi$ is calculated by interpolation, it is possible to obtain an operation parameter that suits the present torque variation rate.

Then, at a step $a_{20}$, this correction value $\alpha$ is added to the previously obtained basic ignition timing. At a step $a_{21}$, corrections for the engine cooling water temperature and the intake air temperature are effected and the resulting calculated data is set in the register of the ignition timing controlling register/counter unit 806 at a step $a_{22}$ thereby returning the current interrupt processing (at a step $a_{23}$).

Figure 7:
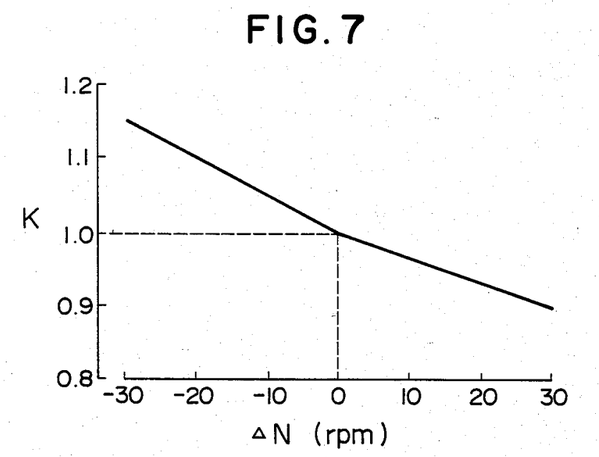
Figure 8:
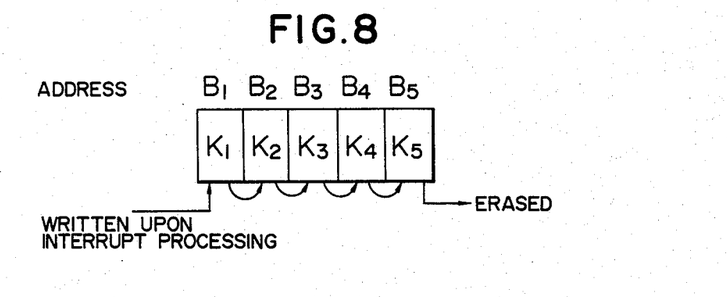
FIG. 8 is a data diagram showing the manner in which fuel injection quantity correction factors K are stored.

On the other hand, when the fuel injection quantity interrupt command signal E is received, a transfer is made from the step $a_1$ to a step $b_1$ (in FIG. 3C) where the same operation as the step $a_2$ is performed to fetch the values of N and $P_m$. At a step $b_2$, a basic fuel injection quantity is calculated from the values of N and $P_m$ fetched at the step $b_1$. At a step $b_3$, whether the correction flag A has been set by the latest ignition timing interrupt processing is determined. If it is, a transfer is made to a step $b_4$ and the correction flag A is reset. At steps $b_5$, $b_6$, $b_7$, and $b_8$, the similar operations as the steps $a_9$, $a_{10}$, $a_{11}$ and $a_{12}$ are performed to obtain a basic injection quantity correction factor $K_1$. FIG. 7 shows a correction factor setting map for the values of $\Delta N$. At steps $b_9$, $b_{10}$, $b_{11}$, $b_{12}$ and $b_{13}$, the similar operations as the steps $a_{13}$, $a_{14}$, $a_{15}$, $a_{16}$ and $a_{17}$ are performed to update the data Ki on the RAM as shown in FIG. 8. In the case of the injection interrupt, the reason for i=5 at the step $b_9$ is that the period of the injection interrupt is one half that of the ignition interrupt in the case of a four cylinder engine.

At steps $b_{14}$ and $b_{15}$, the similar operations as the steps $a_{18}$ and $a_{19}$ are performed to obtain a correction factor K. The following equation is used for the calculation of K.

If $$i < \phi' < i+1 \text{ (where } i \text{ is an integer)}$$

$$K = (i+1-\phi') \times Ki + (\phi' - i) \times Ki+1.$$

At a step $b_{16}$, the basic fuel injection quantity is multiplied by the correction value K and a transfer is made to a step $b_{17}$ where the required corrections are provided for the cooling water temperature, the intake air temperature, the battery voltage, etc. Then, at a step $b_{18}$, the resulting calculated data is set in the register of the fuel injection controlling register/counter unit 808. Thus, the current interrupt processing is returned (at the step $a_{23}$).

Figure 6:
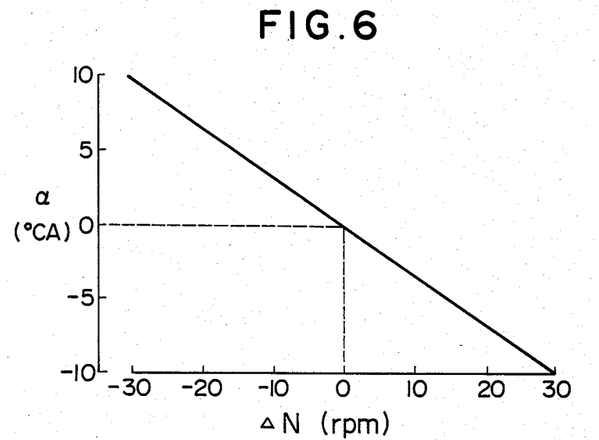
FIGS. 6 and 7 are characteristic diagrams showing respectively the relationship between the engine rotational speed variation $\Delta N$ and the ignition timing correction value $\alpha$ and between the variation $\Delta N$ and the fuel injection quantity correction factor K.

FIGS. 6 and 7 are characteristic diagrams showing respectively the relationship between the engine speed variation rates stored at the designated addresses of the ROM section of the memory unit 805 and the ignition timing correction values $\alpha$ and the fuel injection quantity correction factors K, respectively. The fuel injection quantity correction factors K according to the engine speed variation rates (in terms of RPM) are stored at the corresponding addresses in the ROM section of the memory unit 805 with such a characteristic as shown in FIG. 7. In other words, when the engine speed decreases so that the engine speed variation rate becomes negative, the fuel injection quantity is corrected in a direction to increase it and the engine torque is increased thereby preventing the engine speed from decreasing. Conversely, when the engine speed increases so that the engine speed variation rate becomes positive, the fuel injection quantity is corrected in a direction to decrease it and the engine torque is decreased thereby preventing the engine speed from rising. Since the engine torque characteristic at around the stoichiometric air-fuel ratio is such that the same air-fuel ratio variation to each of the lean and rich sides of the stoichiometric air-fuel ratio results in a greater decrease in the torque on the lean side than an increase in the torque on the rich side, the correction values corresponding to the negative engine speed variations are preset greater than those corresponding to the positive engine speed variations. On the other hand, the ignition timing correction values $\alpha$ (in terms of crank angle degrees) according to the engine speed variation rates (in terms of RPM) are stored at the corresponding addresses of the ROM section in the memory unit 805 with such a characteristic as shown in FIG. 6. In other words, when the engine speed decreases so that the engine speed variation rate becomes negative, the ignition timing is corrected in a direction to advance it and the engine torque is increased thereby preventing the engine speed from decreasing. On the contrary, when the engine speed increases so that the engine speed variation rate becomes positive, the ignition timing is corrected in a direction to retard it and the engine torque is decreased thereby preventing the engine speed from increasing.

While the above-described embodiment of the invention is applied to a four cylinder engine equipped with a speed-density type electronic fuel injection system, the invention is not limited thereto and it is applicable to multi-cylinder engines having for example six or eight cylinders as well as multi-cylinder engines of the type equipped with a mass-flow type electronic fuel injection system.

While, the above-described embodiment is used mainly for controlling an engine having an electronic fuel injection system, the invention is not limited thereto and the invention is also applicable to engines of the type including an electronically controlled carburetor.

We claim:

1. A method for controlling the idle operation of an internal combustion engine comprising the steps of:
    detecting at successive times a rotational speed of said engine and determining a variation characteristic thereof;
    determining a torque variation characteristic of said engine as a function of said rotational speed variation characteristic of said engine;
    determining a phase difference between said rotational speed variation and torque variation characteristics as a function of said engine rotational speed;
    determining a present value of engine torque variation as a function of said torque variation characteristic; and
    controlling at least one engine operation parameter in a direction to minimize said engine torque variation.

2. A method according to claim 1, wherein said step of determining a torque variation characteristic torque variation characteristic comprises the steps of approximating the same as an engine rotational speed variation characteristic but having said phase difference determined on the basis of said therefrom which phase difference is a function of engine rotational speed.

3. A method according to claim 1, wherein said step of determining phase difference as a function of rotation speed comprises the steps of preliminarily determining experimentally the relationship between an engine rotational speed variation characteristic and an engine torque variation characteristic, and forming a map indicating the phase difference between the speed variation characteristic and torque variation characteristic as a function of engine speed.

4. A method according to claim 1, wherein said step of controlling at least one engine operation parameter comprises the step of correcting ignition timing, said ignition timing being corrected by obtaining an ignition timing correction value from among a plurality of ignition timing correction values preliminarily stored successively for predetermined times at predetermined angular position intervals of said engine and correcting said ignition timing by said calculated ignition timing correction value.

5. A method according to claim 1, wherein said at least one engine operation parameter includes a fuel injection quantity, and said fuel injection quantity is corrected by calculating a fuel injection quantity correction value at a position preceding by said phase difference from a plurality of fuel injection quantity correction values preliminarily stored successively for predetermined times at a predetermined angular position interval of said engine and correcting said fuel injection quantity by said calculated fuel injection quantity correction value.

6. An apparatus for controlling the idle operation of an internal combustion engine by controlling engine rotational speed to a predetermined idling speed by correcting at least one engine operation parameter, said apparatus comprising:

sensor means for detecting a rotational angle of said engine;

a rotational speed counter, connected to receive a signal from said sensor means, for determining an engine rotational speed successively at predetermined angular position intervals of said engine;

means, responsive to engine rotational speed as determined by said rotational speed counter, for calculating successively a variation in said engine rotational speed between the present rotational speed and the previously determined one;

means for determining successively a correction value of said engine operation parameter corresponding to said variation in said engine rotational speed, said speed variation substantially representing a variation in engine torque but offset therefrom by a phase difference lagging from said speed variation;

means for storing said determined correction value of said engine operation parameter successively for predetermined times;

means for determining said phase difference between said variation in said engine rotational speed and said variation in said engine torque as a function of engine rotational speed as determined by said rotational speed counter;

means for calculating a correction value from said stored correction values and said phase difference determined by said engine rotational speed, said calculated correction value corresponding to a correction value at an angular position of said engine preceding by said phase difference; and means for correcting said engine operation parameter with said correction value.

7. An apparatus according to claim 6, wherein said means for determining a correction value includes a stored map representing a predetermined relationship between said correction value and said variation in engine rotational speed.

8. An apparatus according to claim 6, wherein said means for storing said determined correction value stores for said predetermined times extending over an angular rotational range of said engine larger than said phase difference.

* * * * *

UNITED STATES PATENT AND TRADEMARK OFFICE
CERTIFICATE OF CORRECTION

PATENT NO. : 4,509,477
DATED : April 9, 1985
INVENTOR(S) : M. TAKAO et al

It is certified that error appears in the above-identified patent and that said Letters Patent is hereby corrected as shown below:

Priority Data omitted from Title Page. Should read:

--Foreign Application Priority Data

November 19, 1982    Japan    57-204363--

Signed and Sealed this

Sixteenth Day of September 1986

[SEAL]

Attest:

DONALD J. QUIGG

Attesting Officer    Commissioner of Patents and Trademarks